Figure 1:
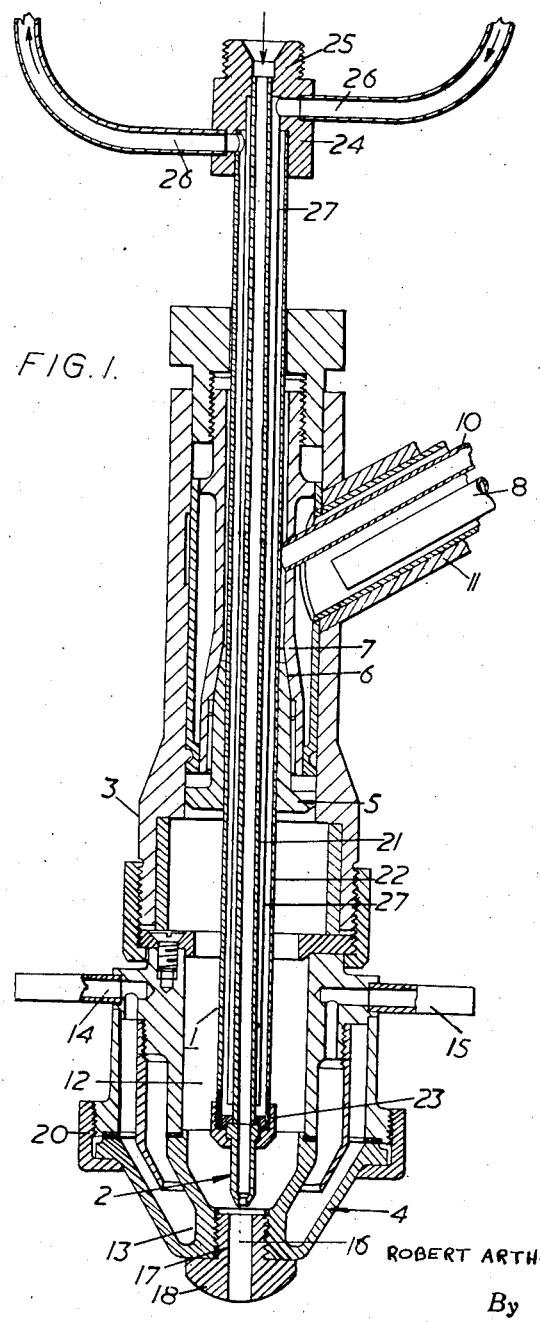

June 27, 1961

R. A. CRESSWELL 2,990,466

ELECTRIC ARC WORKING PROCESS AND APPARATUS

Filed Dec. 11, 1958

2 Sheets-Sheet 1

Inventor
ROBERT ARTHUR CRESSWELL
By
Aaron R. Townshend Attorney

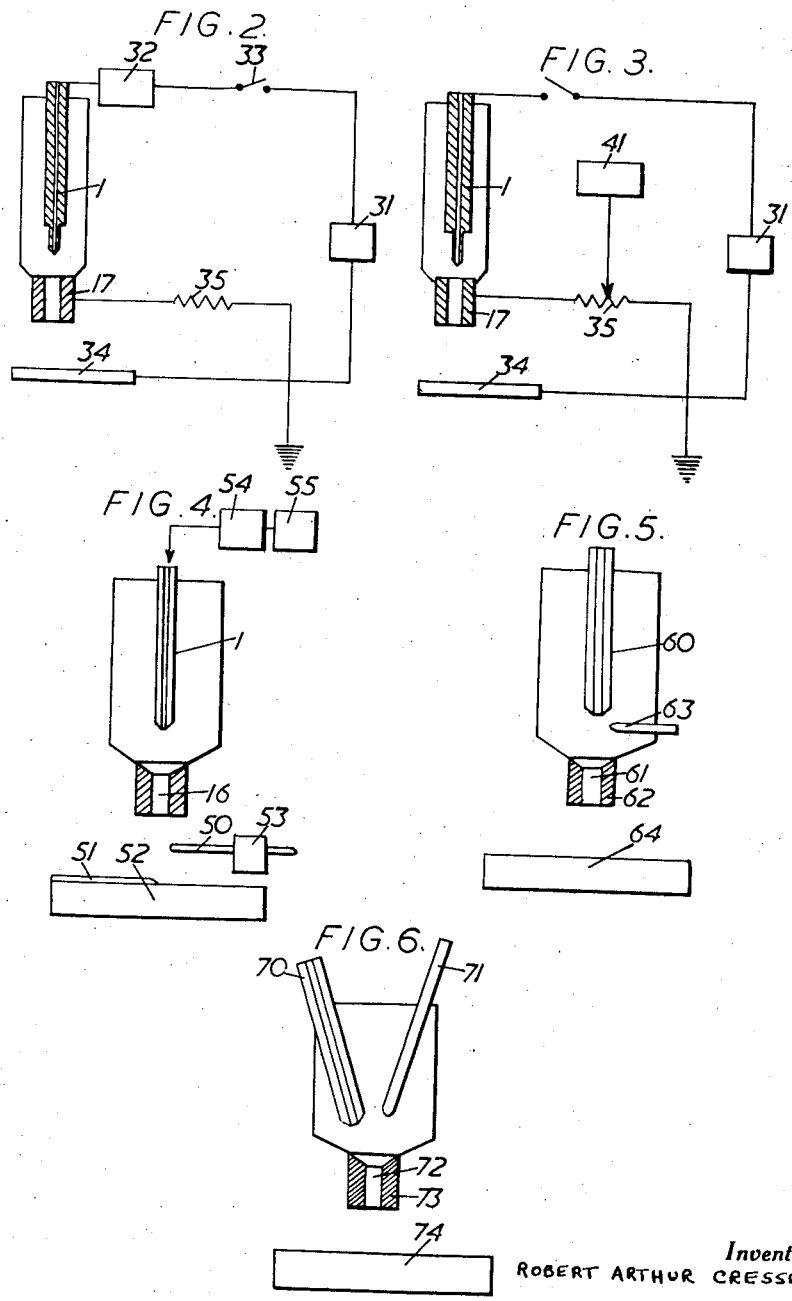

United States Patent Office 2,990,466
Patented June 27, 1961

2,990,466
ELECTRIC ARC WORKING PROCESS AND APPARATUS
Robert Arthur Cresswell, Tadworth, England, assignor to The British Oxygen Company Limited, a British company
Filed Dec. 11, 1958, Ser. No. 779,656
Claims priority, application Great Britain Dec. 18, 1957
5 Claims. (Cl. 219—75)

This invention relates to a process and apparatus for electric arc working. The term electric arc working is intended to include operations in which use is made of an electric arc, such as arc cutting, gouging, scarfing, and de-seaming, arc welding, high speed arc welding, deep penetration welding, hard facing and similar forms of metal deposition. The term includes operations in which metallic or non-metallic articles are subjected to treatment.

In particular, the present invention is concerned with electric arc working operations in which electric currents of from 200 to 600 amperes or upwards are supplied to the electric arc, the arc voltage having a value below 200 volts and preferably of the order of from 40 to 110 volts, and in which the electric arc extends through a narrow passage through which gas is flowing at the rate of hundreds of feet per minute towards the article being worked. It is preferred that this flow of gas be laminar.

According to one aspect of the present invention, in a process for electric arc working in which an electric arc struck between two electrodes passes through a narrow passage with a stream of gas to provide a constricted jet like arc and gas stream which may be directed towards an article to be subjected to an arc working operation, a stream of gas is conveyed to the passage through a bore in one of the electrodes.

According to another aspect of the present invention, an electric arc torch comprises a hollow body, a nozzle mounted on the body and defining a narrow outlet passage from the torch, an electrode mounted within the body with the tip of the electrode spaced from the wall of the outlet passage, the electrode having an internal bore through which gas can flow to the passage, conduit means for supplying gas to the bore in the electrode, and means for conducting electric current to the electrode.

The choice of gas conveyed through the electrode will depend on the particular arc working operation being conducted and the composition of the electrodes. However, the gas will generally consist of at least one of the gases in the following group, namely nitrogen, argon, helium, hydrogen and carbon dioxide.

In addition to the stream of gas delivered through the electrode, a small quantity of gas may be delivered around the electrode to prevent excessive oxidation of the electrode and other parts of the apparatus and to ensure a suitable arc environment around the electrode.

The two electrodes between which the arc is struck may both be disposed upstream of the passage, the arc being extended through the passage by the stream of gas conveyed through said one of the electrodes.

Alternatively, said one of the electrodes may be disposed upstream of the passage and the other electrode disposed downstream of the passage. In this case the other electrode may comprise a metallic article which is to be subjected to an arc working operation, or in some instances, a fusible metal wire.

The electrode through which gas passes is preferably of straight tubular form. The electrode tip may be of reduced external cross-sectional diameter as compared with the shank of the electrode, and the bore extending through the electrode may be of reduced cross-section at the outlet end of the tip in order to increase the velocity of gas leaving the electrode tip. Materials of high melting point, such as tungsten and electrographite or other suitable forms of carbon, may be used for the electrodes but materials of lower melting point such as copper can also be used where effective cooling arrangements are provided. Thus, a copper tube, or a copper tube provided with a thoriated tungsten tip may be used where cooling water is arranged to withdraw heat from the shank of the tube.

The electrode through which gas passes will generally be connected to the negative pole of a source of direct current, the other electrode being connected to the positive pole. Initiation and maintenance of the arc between these electrodes is preferably obtained by means of a high frequency discharge and/or pilot arc. This discharge may take place through or upstream of the passage.

Electric arc working apparatus and arc torches and methods of arc working in accordance with the invention will now be described by way of example with reference to the six figures of the accompanying drawing in which:

FIG. 1 shows a side elevation of a first construction of arc torch,

FIGS. 2 and 3 show alternative power supply circuits for the arc torch of FIGURE 1, FIG. 4 shows in diagrammatic form a construction of arc torch adapted to deposit metal on a workpiece from a fusible electrode, FIG. 5 shows in diagrammatic form a modified construction of arc torch in which the arc is established between two electrodes disposed upstream of the nozzle outlet passage of the torch, one of the electrodes being tubular and being mounted coaxially of the nozzle outlet passage, and FIG. 6 shows in diagrammatic form a modified construction similar to that of FIGURE 5 but with both of the electrodes inclined to the nozzle outlet passage.

Referring now to FIGURE 1 of the drawings, in the first construction of electric arc torch in accordance with the invention, a tubular electrode 1 having a tip 2 is mounted coaxially within a tubular body 3 which is terminated by an annular nozzle 4. This tubular electrode, which is described in detail below, is maintained within the body 3 by a slotted collet 5 which engages in a tapered seating 6 in a liner 7 in the body 3. An electrical connection 8 is provided for conducting electric current to the liner 7 and thence through the collet 5 to the electrode 1, and a conduit 10 is provided for feeding a shielding gas around the shank of the electrode 1, through the slots in the collet 5, and around the electrode tip 2. The connection 8 and conduit 10 extend to the body by way of a handle 11 mounted on the body 3.

The tip 2 of the electrode 1 extends beyond the collet 5 into what may be termed an arcing chamber 12 defined by the body 3 and the annular nozzle 4 mounted coaxially on the body. This nozzle 4 is formed of copper with an internal cooling passage 13 for the flow of cooling water passing through conduits 14 and 15. A narrow outlet passage 16 from the arcing chamber 12 coaxial with the electrode 1 and generally coaxial with the body 3 is defined by a tubular insert 17 of copper received in the nozzle 4.

An electrical connection to the tubular insert 17 is made through the nozzle 4 by way of a conductor (not shown) or of the conduits 14 and 15.

To prevent the nozzle 4 being damaged by molten metal during operation of the torch, the tubular insert 17 is formed with an annular shielding cap 18 which extends laterally of the cylindrical portion to shield the forward end of the nozzle.

The electrode tip 2 and tubular insert 17 may be centralized by moving the forward end of the nozzle 4 laterally to the necessary extent before tightening the locking ring 20. A gauge, not shown, may be inserted in the tubular insert 17 to engage the electrode tip 4 and indicate the lateral adjustment required.

The tubular electrode 1 comprises a tubular shank on which is mounted an annular tip 2 of tungsten or similar substantially non-consumable electrode material. The tubular shank is formed by an inner copper tube 21 whose bore communicates with that of the tip 2 and which is surrounded coaxially by an outer copper tube 22. These tubes 21 and 22 are sealed in fluid-tight manner into an electrically conductive head 23 which couples the tip 2 to these copper tubes. At the end of the electrode remote from the tip 2, the copper tubes 21 and 22 are received in a block 24 provided with a connection 25 for feeding gas through the electrode by way of the inner copper tube 21 and the bore in the annular tip 2, and connections 26 for supplying and withdrawing cooling fluid to and from the space between the copper tubes 21 and 22. This space is divided into inflow and outflow passages by a sleeve 27 secured to the block 24.

The bore within the shank leads into a bore of similar diameter passing axially through the electrode tip 2, this bore being of reduced cross-section at its outlet end, and the outer diameter of the tip corresponds approximately to the diameter of the outlet passage 16 in the nozzle. The term "narrow" has been applied to the outlet passage 16 in this specification to imply that the cross-sectional diameter of this passage is preferably of the same order as the external diameter of the electrode upstream of the passage and certainly not more than three times this diameter.

This general construction of torch has been used experimentally for the arc cutting of 1 inch aluminum plate but with a tubular electrode of electrographite substituted for the water cooled electrode 1 described above. The electrographite electrode had a straight tubular shank terminated by an electrode tip having an external diameter of ¼ inch and an internal outlet diameter of 1/32 inch. In use for arc cutting of 1 inch thick aluminum plate, the tubular electrode was connected to the negative pole of a source of direct current power supply, the positive pole being connected to the aluminum plate. The supply voltage was 100 volts whilst the working arc voltage was 70 volts at a current of 350–400 amperes. A high frequency discharge was set up continuously between the electrode tip and the tubular insert 17 to initiate and maintain the electric arc. A "cutting" gas consisting of a mixture of nitrogen and hydrogen in the proportions of 60:40 by volume was fed through the connection 25 and through the tubular electrode 1 at the rate of 30 cubic feet per hour. Under these conditions, a very good quality cut in the plate was obtained at the rate of 25 to 30 inches per minute. With this electrographite electrode it was not found necessary to feed shielding gas around the electrode tip.

In the use of the present invention for cutting, gas consumption will generally be of the order of 20 to 50 cubic feet per hour. Shielding gas around the electrode, when necessary or desirable, as in the case of thoriated tungsten electrodes, will generally be supplied at the rate of 3 to 10 cubic feet per hour.

Two typical power supply arrangements for the arc torch are shown in FIGURES 2 and 3. In FIGURE 2 the tubular electrode 1 is connected to the negative pole of a power source 31 by way of a source 32 of high frequency current, for example a spark oscillator, and a contactor 33. A workpiece 34 to be subjected to an arc working operation is connected to the positive pole of the power source 31 so that an electric arc may be established between the tubular electrode 1 and the workpiece 34. Initiation and maintenance of the electric arc is assisted by a high frequency discharge taking place between the electrode 1 and the tubular insert 17. The tubular insert 17 is connected to the workpiece 34 through a low value resistor 35 so that a pilot arc is established between the electrode 1 and the tubular insert 17.

In the alternative power supply arrangement shown in FIGURE 3, a high frequency high voltage is applied to a low value resistor 35 from a source 41. In other respects this arrangement is identical to that shown in FIGURE 2. In both arrangements it may be possible to switch off the high frequency source after the electric arc has been established.

A further embodiment of the present invention useful for welding, hard facing, metal coating and similar operations is shown diagrammatically in FIGURE 4. In this case the arc is struck between the tubular electrode 1 and a fusible wire electrode 50 advanced generally perpendicularly to the axis of the torch downstream of the outlet passage 16 to form a deposit of metal 51 on a workpiece 52. If desired, powdered materials, such as alloying materials, may be entrained in the gas stream flowing through the tubular electrode 1. These materials will attain a high temperature during their travel through the arc and will be delivered to the workpiece being arc worked by the gas and arc stream. Refractory and other surface coatings may be applied to workpieces by supplying suitable powder in this way.

The details of the arc torch shown in FIGURE 1 are applicable to this embodiment. Additional apparatus required is a device 53 for feeding and directing the fusible wire electrode 50 to the arc and gas stream. Where powder is to be entrained in the gas stream it is also necessary to connect a powder dispenser 54 to the tubular electrode 1 and to a source 55 of gas under pressure.

In a variation of this embodiment the electric arc is established between the tubular electrode 1 and the workpiece 52 and a fusible wire is fed to the arc and gas stream downstream of the outlet passage 16. In this case electric current is not fed through the fusible wire, which is melted off and applied to the workpiece by the arc and gas stream.

In two alternative embodiments shown in diagrammatic form in FIGURES 5 and 6, the electric arc is established between two electrodes disposed upstream of an outlet passage of the arc torch in which they are mounted. In the embodiment shown in FIGURE 5, a tubular electrode 60 is mounted coaxially of an outlet passage 61 of a nozzle insert 62. The electric arc is established between this electrode 60 and a solid electrode 63 which is mounted perpendicularly to and adjacent to the tip of the electrode 61. A stream of gas flowing through the electrode 60 directs the arc and gas stream through the passage 61 towards a workpiece 64.

In the alternative embodiment shown in FIGURE 6, the electric arc is established between a tubular electrode 70 and a solid electrode 71 which are each inclined at 17° to 20° to the axis of an outlet passage 72 of a nozzle insert 73. The arc and gas stream is directed at a workpiece 74.

The two embodiments shown in FIGURES 5 and 6 are particularly suitable for the dispensation of tungsten, vanadium, titanium, cobalt, and other high melting point carbides supplied in powder form through the tubular electrode. Since these materials may contaminate the walls of the outlet passage it is preferred that this passage be defined by a nozzle insert of silicon nitride. Tungsten has been used as the electrode material in these embodiments.

Further applications of the present invention which make use of the very concentrated and intense source of heat provided by the jet-like arc and gas stream will be illustrated by the following examples.

Welding of stainless steel plate of ¾ inch thickness was carried out satisfactorily with a filler rod of ⅛ inch diameter fed to the arc downstream of the nozzle at 35 inches per minute. A weld preparation consisting of ⅛ inch nose and a bevel of 35° included angle was used.

Arc voltage was in the range 60 to 80 volts and welding current was 350 amperes. The tubular electrode comprised a water cooled tubular copper shank provided with a tubular tungsten tip. External and internal diameters of the electrode tip were 3/16 inch and 1/32 inch respectively. Nitrogen was fed through the electrode at 45 cubic feet per hour. Shielding gas, also nitrogen, was fed around the electrode tip at 5 cubic feet per hour.

Piercing of 1/4 inch heat resistant stainless steel plate was effected at the rate of 3/16 inch diameter hole per 2–3 seconds using nitrogen/hydrogen mixtures in the proportion of 70:30 by volume. This gas mixture was fed at 50 cubic feet per hour through a tubular tungsten electrode having external and internal tip diameters of 3/16 inch and 1/16 inch respectively. Arc voltage and current were 75 volts and 340 amperes respectively.

A hard facing deposit was applied at the rate of 10 lbs. per hour using argon as a shielding gas and as the main stream of gas. An iron wire was fed to the arc and gas stream downstream of the nozzle, and alloying materials, including chromium in the form of ferrochromium, were entrained in the stream of argon passing through the electrode. The hard facing deposit comprised:

|  | Percent |
|---|---|
| Chromium | 24.5 |
| Tungsten | 13 |
| Cobalt | 15 |
| Vanadium | 1.5 |
| Carbon | 2.7 |

The remainder being iron.

The arc voltage was 72 volts, and the arc current was 360 amperes.

I claim:

1. In a method of electric arc working in which an electric arc struck between two electrodes is constrained to emerge from a narrow passage together with a stream of gas to provide a constricted jet-like arc and gas stream for treating a workpiece, the improved process comprising the combination of the steps of establishing an arc between two electrodes, directing a continuous stream of gas into said arc along the longitudinal axis of one of said electrodes internally of said electrode, directing a second continuous stream of gas, at a lesser rate of flow than said first stream, in the direction of the longitudinal axis of said one electrode externally thereof and into said arc, and laterally constricting the composite arc and gas streams thereby produced to form a jet-like arc and gas stream.

2. In the method of electric arc working in which an electric arc struck between two electrodes is constrained to emerge from a narrow passage together with a stream of gas to provide a constricted jet-like arc and gas stream for treating a workpiece, the improved process comprising the combination of the steps of establishing between two electrodes an electric arc having a voltage below 200 volts with an electric current of 200 to 600 amperes, directing a continuous stream of gas into said arc along the longitudinal axis of one of said electrodes and internally of said electrode so that the gas stream enters the arc from the tip thereof, directing a second continuous stream of gas, at a lesser rate of flow than said first stream, in the direction of the longitudinal axis of said one electrode externally thereof and into said arc, and laterally constricting the composite arc and gas stream thereby produced to form a jet-like arc and gas stream.

3. In the method of electric arc working in which an electric arc struck between two electrodes is constrained to emerge from a narrow passage together with a stream of gas to provide a constricted jet-like arc and gas stream for treating a workpiece, the improved process comprising the combination of the steps of establishing an arc between two electrodes, directing a continuous stream of gas into said arc along the longitudinal axis of one of said electrodes internally of said electrode, continuously supplying powdered material in entrainment in said stream of gas, directing a second continuous stream of gas, at a lesser rate of flow than said first stream, in the direction of the longitudinal axis of said one electrode externally thereof and into said arc, and laterally constricting the composite arc, gas and powder stream thereby produced to form a jet-like stream.

4. In the method of electric arc welding and hard facing in which an electric arc struck between two electrodes is constrained to emerge from a narrow passage together with a stream of gas to provide a constricted jet-like arc and gas stream, the improved process comprising the combination of the steps of establishing between two electrodes an electric arc having a voltage in the range 60–80 volts and a current in the range of 350–360 amperes, directing a continuous stream of gas into said arc along the longitudinal axis of said electrode and internally thereof at a flow rate of the order of 45 cubic feet per hour so that the gas stream enters the arc from the tip of the electrode, directing a second continuous stream of gas at a flow rate of the order of 5 cubic feet per hour in the direction of the longitudinal axis of electrode externally thereof and into the arc, laterally constricting the composite arc and gas stream thereby produced to form a jet-like arc and gas stream, and feeding filler rod to said jet-like arc and gas stream.

5. In the method of electric arc cutting in which an electric arc struck between an electrode and the work undergoing cutting is constrained to emerge from a narrow passage together with a stream of gas to provide a constricted jet-like arc and gas stream, the improved process comprising the combination of the steps of establishing between the electrode and the work an electric arc having a voltage of the order of 70 volts at a current of 350–400 amperes, directing a continuous stream of gas into said arc along the longitudinal axis of said electrode and internally thereof at a flow rate of 20–50 cubic feet per hour so that the gas stream enters the arc from the tip of the electrode, directing a second continuous stream of gas at a flow rate of 3–10 cubic feet per hour in the direction of the longitudinal axis of the electrode externally thereof and into said arc, and laterally constricting the composite arc and gas stream thereby produced to form a jet-like arc and gas stream.

References Cited in the file of this patent

UNITED STATES PATENTS

| | | |
|---|---|---|
| 2,512,707 | Anderson | June 27, 1950 |
| 2,768,279 | Rava | Oct. 23, 1956 |
| 2,806,124 | Gage | Sept. 10, 1957 |
| 2,847,555 | Yenni | Aug. 12, 1958 |
| 2,858,412 | Kane et al. | Oct. 28, 1958 |
| 2,871,336 | Lobosco et al. | Jan. 27, 1959 |
| 2,892,067 | Donald | June 23, 1959 |
| 2,922,869 | Giannini et al. | Jan. 26, 1960 |
| 2,963,570 | Rieppel | Dec. 6, 1960 |